United States Patent [19]

Doi et al.

[11] Patent Number: 4,803,584
[45] Date of Patent: Feb. 7, 1989

[54] DISK CARTRIDGE WITH CLEANING SHEET OF NON-WOVEN FABRIC

[75] Inventors: Hajime Doi; Norio Akai; Fujio Matsumoto, all of Ibaraki, Japan

[73] Assignee: Hitachi Maxell, Ltd., Osaka, Japan

[21] Appl. No.: 42,340

[22] Filed: Apr. 24, 1987

[30] Foreign Application Priority Data

Apr. 25, 1986 [JP] Japan ............................... 61-94874
May 30, 1986 [JP] Japan ............................. 61-123545

[51] Int. Cl.⁴ .......................................... G11B 23/03
[52] U.S. Cl. ................................ 360/133; 206/444
[58] Field of Search ........................... 360/131-133; 206/309-313, 444; 156/580.1

[56] References Cited

U.S. PATENT DOCUMENTS

| 4,263,634 | 4/1981 | Chenoweth et al. | 360/133 |
| 4,417,291 | 11/1983 | Miklos et al. | 360/133 |
| 4,510,546 | 4/1985 | Asami et al. | 360/133 |
| 4,586,606 | 5/1986 | Howey | 206/313 |
| 4,610,352 | 9/1986 | Howey et al. | 206/313 |

FOREIGN PATENT DOCUMENTS

| 0133441 | 2/1985 | European Pat. Off. |
| 3540560 | 5/1986 | Fed. Rep. of Germany |
| 0030272 | 2/1984 | Japan |

Primary Examiner—Stuart N. Hecker
Assistant Examiner—David J. Severin
Attorney, Agent, or Firm—Antonelli, Terry & Wands

[57] ABSTRACT

A disk cartridge which comprises a cartridge case, a disk rotatably encased in the cartridge case, and a cleaning sheet supported on the inside surface of the cartridge case by welding, the cartridge case being composed of a thermoplastic synthetic resin, and the cleaning sheet being composed of non-woven fabric made mainly of acrylic fibers at least on the disk-facing side of the cleaning sheet and being fixed to the inside surfaces of the cartridge case by ultrasonic or heat welding has distinguished disk-handling characteristics and cartridge case-fixing characteristics.

14 Claims, 9 Drawing Sheets

DISK CARTRIDGE WITH CLEANING SHEET OF NON-WOVEN FABRIC

BACKGROUND OF THE INVENTION (1) Field of the Invention

This invention relates to a disk cartridge using a flexible cartridge case or a cartridge case molded from a synthetic resin, for example, a magnetic disk cartridge, etc., and particularly to a cleaning sheet for the disk cartridge.

(2) Prior Art

A disk cartridge, for example, a magnetic disk cartridge, mainly comprises a cartridge case having openings for inserting magnetic heads and openings for inserting a rotation driving shaft, a flexible magnetic disk rotatably encased in the cartridge case, and a cleaning sheet supported on the inside surfaces of the cartridge case.

The cleaning sheet for the conventional magnetic disk cartridge is composed of a non-woven fabric made of, for example, mixed fibers of rayon and polypropylene, mixed fibers of rayon and polyethylene terephthalate, or single fibers of polyethylene terephthalate, and is fixed to the inside surfaces of a cartridge case by heat welding or by an adhesive.

The cleaning sheet must have two kinds of characteristics, i.e. disk-handling characteristics such as the ability to not damage a disk such as a magnetic disk, a distinguished capability to clean the disk, etc., and cartridge case-fixing characteristics such as adhesiveness and weldability.

However, the cleaning sheets composed of the aforementioned fibers do not have good capability to clean the magnetic disk, and further have such problems as causing the development of scratches on the magnetic disk surface by liding contact with the cleaning sheet, falling-away of the fibers from the cleaning sheet by sliding contact with the magnetic disk, and attaching of the fallen-away fibers to the magnetic disk or the magnetic head, thereby having an adverse effect on the recording-reproducing characteristics.

Thus, the so far available cleaning sheets have not satisfied the above two characteristics, and consequently have not exhibited satisfactory functions as a cleaning sheet.

SUMMARY OF THE INVENTION

An object of the present invention is to provide a disk cartridge, such as a magnetic disk cartridge, which has distinguished disk-handling characteristics and cartridge case-fixing characteristics, free from the disadvantages of the abovementioned prior art.

According to the present invention, there is provided a disk cartridge which comprises a cartridge case, a disk rotatably encased in the cartridge case, and a cleaning sheet supported on the inside surface of the cartridge case by welding, the cartridge case being composed of a thermoplastic synthetic resin, and the cleaning sheet being composed of non-woven fabric made mainly of acrylic fibers at least on the disk-facing side of the cleaning sheet and being fixed to the inside surfaces of the cartridge case by ultrasonic or heat welding.

In the present invention, the cleaning sheet is preferably composed of a sheet member of multi-layer structure comprising a disk-facing non-woven fabric layer composed of a non-woven fabric made mainly of acrylic fibers on the disk-facing side and a cartridge case-facing non-woven fabric layer composed of a non-woven fabric containing fibers at least a portion of which are embeddable into the inside surface of the cartridge case by ultrasonic or heat welding of the cleaning sheet to the cartridge case while substantially retaining the fiber form.

As described above, the disk-handling characteristics of the cleaning sheet are specifically a capability to clean a disk such as a magnetic disk, an incapability to damage the disk, and a low degree of falling-away of the fibers from the cleaning sheet by sliding contact with the disk. The present inventors have made extensive studies of non-woven fabrics for the cleaning sheet, and have found that non-woven fabrics made mainly of acrylic fibers have distinguished disk-handling characteristics.

However, the non-woven fabrics composed of the acrylic fibers alone still have some problems. That is, when the non-woven fabrics composed of the acrylic fibers alone are subjected to heat welding to the inside surfaces of a cartridge case by an ordinary heating means requiring a relatively long heating time, such as a hot press, the acrylic fibers are liable to burn out while the fibers undergo shrinking and fusion due to the characteristics of the acrylic fibers. Consequently, the cleaning sheet cannot have a satisfactory welding strength toward the cartridge case, and the cleaning sheet may be peeled off from the cartridge case by repetitions of sliding contact with the disk, or hard materials may be formed on the surface of the cleaning sheet, lowering the capability to clean the disk, or giving more severe damages to the disk. Thus, the characteristics of the acrylic fibers will be lost.

In the present invention, all the foregoing problems have been solved by subjecting a cleaning sheet composed of a non-woven fabric made of acrylic fibers alone on the disk-facing side to welding to a cartridge case by ultrasonic wave that can bring the cleaning sheet to a desired heating temperature and can also bring the interface between the cleaning sheet and the cartridge case into a welding state for a very short heating time with less thermal influence upon the surface of the cleaning sheet.

The thermoplastic synthetic resin for use in the cartridge case includes, for example, polyvinyl chloride, ABS resin, polyacetal resin, polystyrene resin, etc. and a desired cartridge case can be formed therefrom in a jacket shape or by injection molding.

The magnetic disk is prepared by forming a thin magnetic film on one side or both sides of a base film made of polyester, polyimide, or the like by an appropriate means such as coating, vapor deposition, or sputtering, and has an appropriate flexibility.

The structure of a cleaning sheet fixed to and supported on the inside surface of a cartridge case will be described in detail below, referring to embodiments by way of the accompanying drawings.

BRIEF DESCRIPTION OF THE DRAWINGS

FIGS. 1 to 7 show a magnetic disk cartridge according to a first embodiment of the present invention, where

PREFERRED EMBODIMENTS OF THE INVENTION

Figure 1:
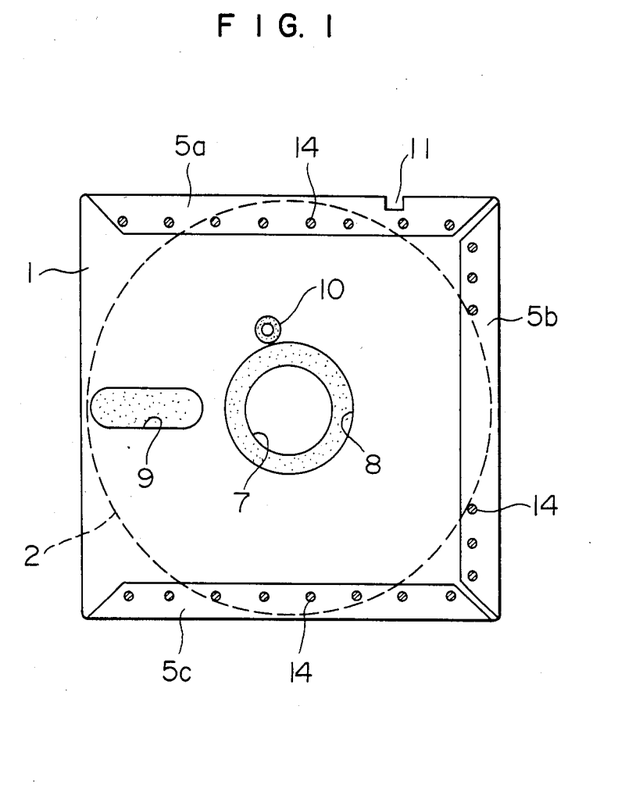
FIG. 1 is a bottom plan view of the magnetic disk cartridge.
Figure 2:
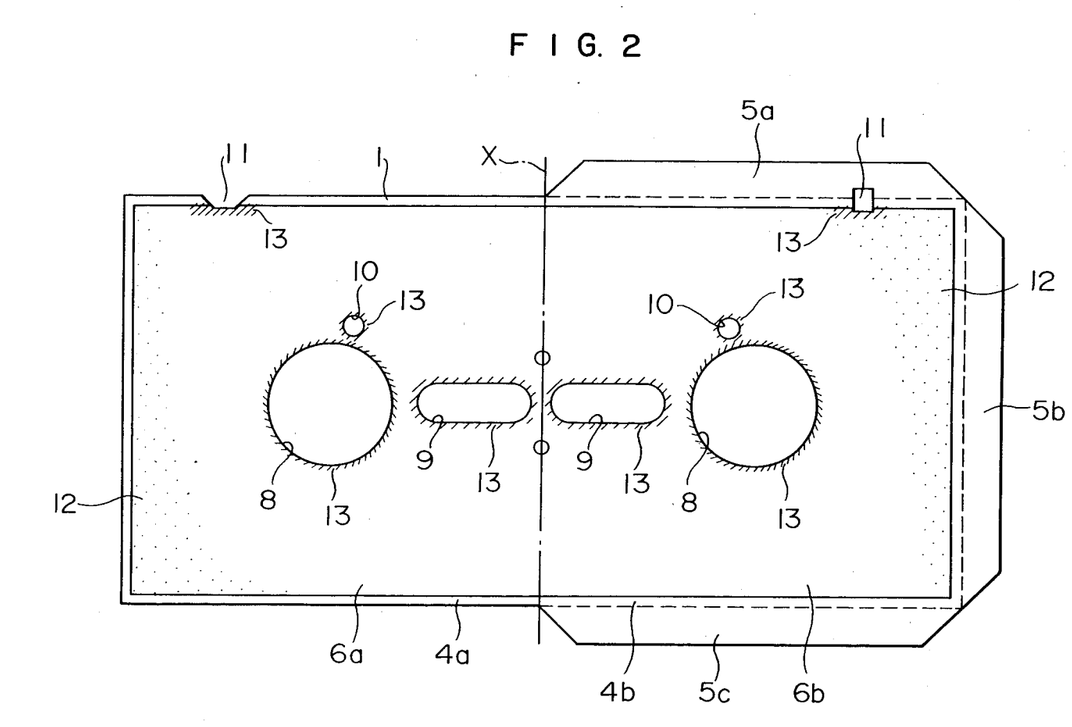
FIG. 2 is an unfolded view of the cartridge case and the cleaning sheet of the magnetic disk cartridge.
Figure 3:
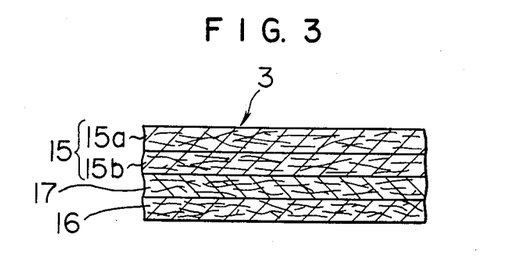
FIG. 3 is an enlarged cross-sectional view of the cleaning sheet.

In FIGS. 1 to 3, a disk cartridge comprises a cartridge case 1, a flexible, sheet-formed magnetic disk 2 rotatably encased in the cartridge case 1, and a cleaning sheet 3 fixed to the inside surface of the cartridge case 1. As shown in FIG. 2, the cartridge case 1 is composed of a rectangular case sheet member 4 made of, for example, polyvinyl chloride, and three extended edge parts 5a, 5b and 5c for pasting are provided at a half section 4b of the case sheet member 4. A rectangular cleaning sheet member 6 having substantially the same area as that of the rectangular case sheet member 4 is fixed to one side of the case sheet member 4 by ultrasonic or heat welding, as will be described later.

In the two square sections 4a and 4b, and 6a and 6b of the case sheet member 4 and the cleaning sheet member 6, respectively, divided by a center folding line X (imaginary line), openings 8 for inserting a rotation driving shaft, which are larger in diameter than the center hole 7 of the magnetic disk 2 (see FIG. 1) and are directed to expose the peripheral part around the center hole 7, openings 9 for inserting magnetic heads, detection openings 10 for detecting the position of the running direction of the magnetic disk 2, thereby correctly tracking the magnetic disk 2, notches 11 for detecting the side A or B of the magnetic disk cartridge, etc. are provided at symmetrical positions along the center folding line X.

After the cleaning sheet member 6 has been placed on the case sheet member 4, the cleaning sheet member 6 is subjected to spotwise ultrasonic or heat welding 12 substantially all over the cleaning sheet member 6, whereas the peripheral parts around the openings 8 for inserting a rotation driving shaft, the openings 9 for inserting magnetic heads, the detection openings 10 and the notches 11 are subjected to linear ultrasonic or heat welding 13, as shown in FIG. 2, whereby the cleaning sheet members 6 can be fixed to the case sheet member 4 without impairing the softness and elasticity of the cleaning sheet member 6. In this case, it is not always necessary to make the spotwise ultrasonic or heat welding 12 all over the cleaning sheet member 6, but to such a degree that the cleaning sheet member 6 is so fixed as not to be readily released from the case sheet member 4.

Then, the case sheet member 4 is folded along the center folding line X so that the cleaning sheet member 6 may be on the inside, and the extended edge parts 5a and 5c, which are counterposed to each other, among the three extended edge parts 5a, 5b and 5c for pasting provided on the square section 4b are folded over the outside of the other square section 4a, and subjected to partial ultrasonic or heat welding 14 to prepare a bag having an open end. A magnetic disk 2 stamped out of a magnetic sheet is inserted into the bag, and then the remaining extended edge part 5b for pasting is folded over the outside of the square section 4a and subjected to spotwise ultrasonic or heat welding 14, whereby the magnetic disk cartridge as shown in FIG. 1 can be built.

The cleaning sheet 3 is composed of three layers as shown in FIG. 3. The structure, etc. of the cleaning sheet 3 will be described in detail below, referring to FIGS. 3 to 8.

As shown in FIG. 3, the cleaning sheet 3 comprises a disk-facing non-woven fabric layer 15, which faces the magnetic disk 2, a cartridge case-facing non-woven fabric layer 16, which faces the cartridge case 1, and an intermediate layer 17 which links to disk-facing non-woven fabric layer fabric 15 and the cartridge case-facing non-woven fabric layer 16.

The disk-facing non-woven fabric layer 15 is made of acrylic fibers alone. The acrylic fibers are synthetic fibers containing more than about 85% of acrylonitrile, copolymerized with acrylate ester, vinyl acetate, styrenesulfonic acid, etc. to improve the frictional resistance or wear resistance, look like wool most among the synthetic fibers and have a distinguished soft-tough flexibility. The acrylic fibers (staples) have a tensile strength of about 2.5 to about 5.0 g/D, an elongation of about 25 to about 50%, an elastic elongation of about 90 to about 95% (at 3% elongation) and a specific gravity of about 1.14 to about 1.17. In the present invention, acrylic fibers having sizes of about 1 to about 6 denier are preferably used.

In this embodiment, the disk-facing non-woven fabric layer 15 is made of acrylic fibers alone in order to fully exhibit the distinguished disk-handling characteristics of the acrylic fibers. However, the present invention is not limited thereto. For example, the acrylic fibers can contain not more than 50% by weight of other kind of fibers such as polyethylene terephthalate, polypropylene, polyamide, rayon, etc. in order to enhance the linking strength with the lower layer or improve the frictional resistance of the layer surface.

The cartridge case-facing non-woven fabric layer 16 is composed of a mixed fiber layer of rayon fibers and polyethylene terephthalate fibers, where the mixing ratio of the rayon fibers to the polyethylene terephthalate fibers by weight can be appropriately selected from a range of about 1/9 to about 9/1, preferably 3/7 to 7/3. Examples of the rayon fibers for use in the present invention include viscose rayon fibers, cupro ammonium rayon fibers, acetate rayon fibers, etc. The rayon fibers (staples) have a tensile strength of about 2.5 to about 3.1 g/D, an elongation of about 16 to about 22%, an elastic elongation of about 55 to about 80% (at 3% elongation) and a specific gravity of about 1.50 to about 1.52.

On the other hand, the polyethylene terephthalate fibers are polyester fibers obtained by polycondensation of terephthalic acid or dimethyl terephthalate with ethylene glycol. The polyethylene terephthalate fibers (staples) have a tensile strength of about 4.7 to about 6.5, an elongation of about 20 to about 50%, and elastic elongation of about 90 to about 99% (at 3% elongation) and a specific gravity of about 1.38.

In this embodiment, at least the disk-facing non-woven fabric layer 15 and the cartridge case-facing non-woven fabric layer 16 are indispensable, and may be bonded together by a binder, but can be appropriately bonded together without impairing the distinguished softness of the acrylic fibers in the disk-facing non-woven fabric layer 15 by providing an intermediate layer 17 composed of a non-woven fabric containing thermoplastic fibrs therebetween, as described above.

For the intermediate layer 17, various thermoplastic fibers of, for example, polyethylene terephthalate, polyethylene, polypropylene, polystyrene, polyamide, polyvinyl chloride, etc. can be used. Since the acrylic fibers are used in the disk-facing non-woven fabric layer 15 and the polyethylene terephthalate fibers are used in the cartridge case-facing non-woven fabric layer 16, it is preferable in view of the matching of the layer 15 to the layer 16 to use a mixed fiber layer of acrylic fibers and polyethylene terephthalate fibers as the intermediate layer 17. The mixing ratio of the acrylic fibers to the polyethylene terephthalate fibers by weight can be appropriately selected from a range of 1/9 to 9/1, preferably 3/7 to 7/3.

Unit areal weight of the cleaning sheet 3 composed of such layers as described above may be preferably limited, and is appropriately about 20 to about 40 g/m$^2$. The unit areal weight is an average of 5 samples, 50 cm$\times$50 cm, obtained by measuring each weight.

Figure 4:
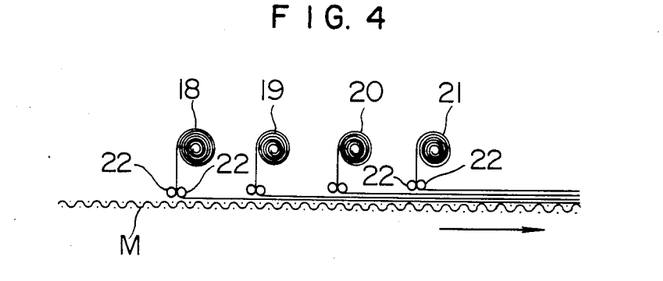
FIG. 4 is a schematic view of a process for preparing the cleaning sheet.

In FIG. 4, one example of preparing the cleaning sheet 3, is shown, where a roll wound with a mixed fiber fabric 18, a roll wound with a mixed fiber fabric 19, a roll wound with a single fiber fabric 20 and a roll wound with a single fiber fabric 21 are arranged in this order.

The mixed fiber fabric 18 is a non-woven fabric made of rayon fibers and polyethylene fibers at a mixing ratio of the rayon fibers to the polyethylene terephthalate fibers of 3:7 by weight and is ultimately made into the cartridge case-facing non-woven fabric layer 16. The mixed fiber fabric 19 is a non-woven fabric made of polyethylene terephthalate fibers and acrylic fibers at a mixing ratio of the polyethylene terephthalate fibers to the acrylic fibers of 5:5 by weight and is ultimately made into the intermediate layer 17. The single fiber fabrics 20 and 21 are both non-woven fabrics made of acrylic fibers alone and are ultimately made in the disk-facing non-woven fabric layers 15a and 15b, respectively (see FIG. 3).

In FIG. 4, numeral 22 shows individual guide rollers for continuously letting out the fabrics 18, 19, 20 and 21, and M shows a wiremesh for conveying the overlaid non-woven fabrics. The fabrics 18, 19, 20 and 21 each have a thickness of 50 $\mu$m, and the fabrics 18, 19, 20 and 21 successively laid one upon another on the wiremesh M are passed between heating rollers, whereby they are controlled to a predetermined thickness and the polyethylene terephalte fibers mixed as thermoplastic fibers in the cartridge case-facing non-woven fabric layer 16 and the intermediate layer 17 are highly entangled with other fibers while shrunken by the heating and at the same time the surfaces of the polyethylene terephthalate fibers are softened and fused. The disk-facing non-woven fabric layer 15, the cartridge case-facing non-woven fabric layer 16 and the intermediate layer 17 are integrally linked to one another thereby to form the cleaning sheet member 6.

In this embodiment, a first disk-facing nonwoven fabric layer 15b is composed of the single fiber fabric 20 and a second disk-facing non-woven fabric layer 15a is composed of the single fiber fabric 21, as shown in FIGS. 3 and 4. If the disk-facing non-woven fabric layer 15 is composed of a plurality of thin layers, as described above, there will be such an advantage that the unevenness in the total thickness can be reduced.

Figure 5:
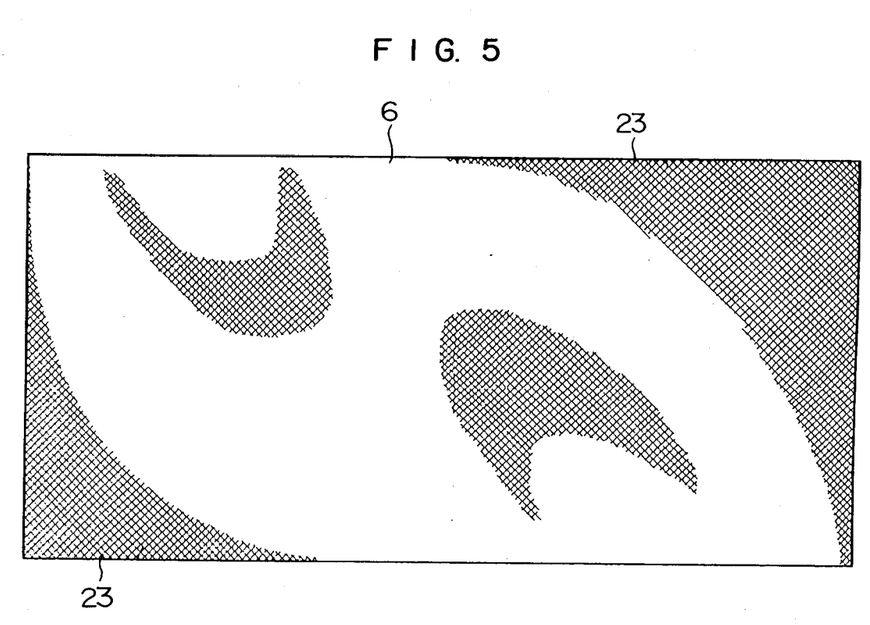
FIG. 5 is a plan view of the cleaning seeet before being fixed to the cartridge case.

The thus obtained cleaning sheet member 6 is passed between rollers each provided with, for example, a knurling tool around the roller surface (embossing treatment), whereby an embossing pattern 23 can be formed on the cleaning sheet member 6, as shown in FIG. 5. In FIG. 2, the embossing pattern 23 is not shown in FIG. 2 for simplifying the drawing. Then, the thus embossed cleaning sheet member 6 is fixed to the case sheet member 4 by spotwise ultrasonic or heat welding 12 and also by linear ultrasonic or heat welding 13, as already described before.

Figure 6:
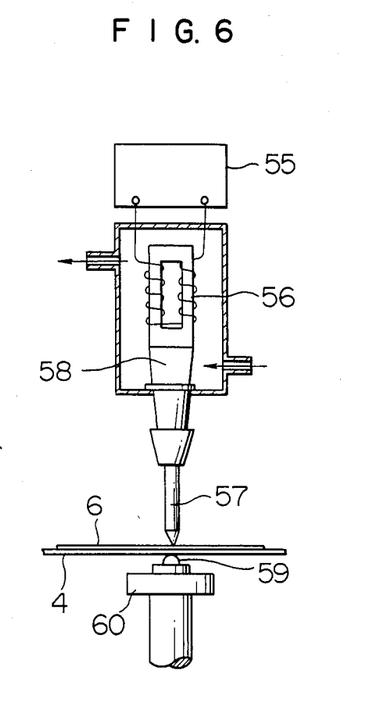
FIG. 6 is a schematic structural view of an apparatus for ultrasonic welding of the cleaning sheet to the cartridge case.

FIG. 6 is a schematic structural view of an apparatus for ultrasonic welding, where numeral 55 is a transistor-based high frequency generator, 56 is a transducer for converting the high frequency wave electrical vibrations generated in the high frequency wave generator 55 to mechanical vibrations, 57 is a welder concentrator having a pointed edge connected to the transducer 56 through an adaptor 58, 59 is a welder anvil which faces the concentrator 57 and is fixed to a work bed 60. As shown in FIG. 6, the case sheet member 4 and the cleaning sheet member 6 are pinched by both the concentrator 57 and the anvil 59 under some pressure applied thereto, so that ultrasonic vibrations can be applied thereto in a direction perpendicular to the surfaces of the sheet members 4 and 6. One example of the ultrasonic welding conditions is as follows:

Welding time: 0.1 to 0.5 sec.
Pressure: 0.1 to 1.0 g/mm$^2$

Figure 7:
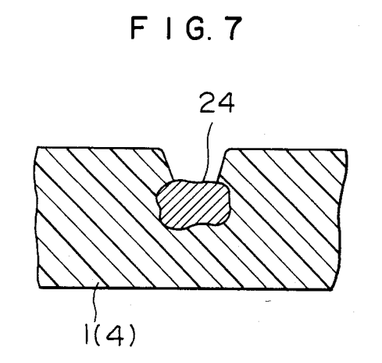
FIG. 7 is a partially enlarged, cross-sectional view of a linking state between the cartridge case and the fiber of the cleaning sheet.

Heat welding is also carried out under some pressure in the following conditions:

Heating temperature: 150° to 300° C.
Heating time: 0.5 to 5 sec.
Pressure: 0.1 to 1.0 g/mm$^2$ Polyvinyl chloride sheet that makes the cartridge case 1 (case sheet member 4) softens at about 65° to about 85° C. and is plasticized at about 120° to about 150° C. and starts to melt at about 170° C., while the rayon fibers in the cartridge case-facing non-woven fabric layer 16 has a property to decompose at about 260° to about 300° C. by heating without softening or melting. Thus, when the cleaning sheet 3 (cleaning sheet member 6) is subjected to ultrasonic or heat welding to the cartridge case 1 (case sheet member 4) under some pressure as described above, the rayon fibers 24 in the cartridge case-facing non-woven fabric layer 16 in the cleaning sheet 3 (cleaning sheet member 6) are embedded into the inside surface layer of the cartridge case 1 (case sheet member 4), while retaining the fiber form, as shown in FIG. 7. Since the cross-sectional shapes of the rayon fibers 24 are non-circular, the cleaning sheet 3 can be firmly fixed to and held in the cartridge case 1, when the rayon fibers are embedded into the cartridge case 1 (case sheet member 4).

The remaining parts of the embedded rayon fibers 24 are in an entangled state with one another and with the polyethylene tetraphthalate fibers in the woven-fabric, and the polyethylene terephthalate fibers, and the acrylic fibers are welded to one another, respectively, through the non-woven fabrics, by the ultrasonic or heat welding, and ultimately the cleaning sheet 3 can be firmly fixed to and held in the cartridge case 1 thereby.

In this first embodiment, the mixing ratio of the rayon fibers to the polyethylene terephthalate fibers of 3:7 by weight in the cartridge case-facing non-woven fabric layer 16 is used, but the mixing ratio can be increased, for example to about 7:3 by weight. Furthermore, in this first embodiment the mixing ratio of the polyethylene terephthalate fibers to the acrylic fibers of 5:5 by weight in the intermediate layer is used, but the mixing ratio of the polyethylene terephthalate fibers directly taking part in the linking of the layers can be increased to, for example, about 7:3.

Figure 8:
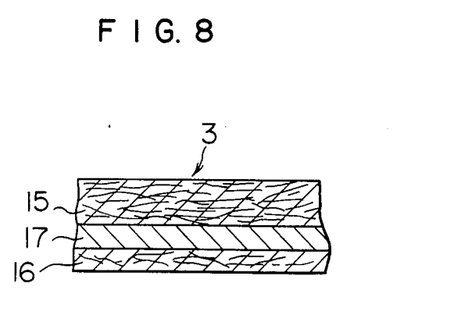
FIG. 8 is an enlarged cross-sectional view of a cleaning sheet according to a second embodiment of the present invention.

FIG. 8 is an enlarged cross-sectional view of the cleaning sheet 3 according to a second embodiment of the present invention, where the disk-facing non-woven fabric layer 15 is composed of a thick single layer made of acrylic fibers alone, differently from the first embodiment, and the intermediate layer 17 is composed of a thermoplastic synthetic resin film such as polyvinyl chloride film, polyamide film, polystyrene film, etc. In FIG. 8, the intermediate layer 17 is depicted as a layer of uniform thickness, but actually, is not as uniform uniform layer as depicted in FIG. 8 due to the plasticization and ultrasonic or heat welding of the intermediate layer 17. Other structural members are substantially the same as those of the first embodiment, and their description is omitted.

In this second embodiment, an embossing pattern can be formed on the surface of the cleaning sheet member 6 as shown in FIG. 5 by knurling tools to give the cleaning sheet member 6 a smooth sliding contact and a good cleaning capability to the magnetic disk. The present cleaning sheet member 6 can be given the function and effect similar to those of the embossings by injecting a water jet to the cleaning sheet, when prepared, to form a large number of fine perforations beside the embossing processing.

As shown in FIGS. 3 and 8, the softness, cleaning capability, etc. peculiar to the acrylic fibers can be fully obtained by making the thickness of the disk-facing non-woven fabric layer 15 made of acrylic fibers only at least twice the thickness of the cartridge case-facing non-woven fabric layer 16.

According to a third embodiment of the present invention, a magnetic disk cartridge as shown in FIG. 1 is prepared by fixing a cleaning sheet composed of a fabric of a single layer or a plurality of layers made of acrylic fibers alone to the inside surface of a cartridge case by ultrasonic or heat welding, where the shape, etc. of the cartridge case and the cleaning sheet are the same as those of the first embodiment, and thus their description is omitted.

Magnetic disk cartridges were prepared, using a cartridge case to which the cleaning sheet of the said first embodiment was fixed by ultrasonic welding (Example 1-A) or heat welding (Example 1-B); a cartridge case to which the cleaning sheet of the said second embodiment was fixed by ultrasonic welding (Example 2-A) or heat welding (Example 2-B); a cartridge case to which the cleaning sheet of the said third embodiment was fixed by ultrasonic welding (Example 3-A) or by heat welding (Example 3-B); a cartridge case to which a cleaning sheet composed of a non-woven fabric made of acrylic fibers alone was fixed by ultrasonic welding (Example 4) or by heat press (Comparative Example 1); a cartridge case to which a cleaning sheet composed of a non-woven fabric made of mixed fibers of rayon fibers and polypropylene fibers in a ratio of the former to the latter of 8:2 by weight was fixed by heat press (Conventional Example 1); and a cartridge case to which a cleaning sheet composed of a non-woven fabric made of polyethylene terephthalate fibers alone was fixed by heat press (Conventional Example 2).

Cuttability, cleanability, magnetic disk scratchability, lint characteristics and weldability of the cleaning sheets of Example 1, Example 2, Comparative Example, and Conventional Examples 1 and 2 were determined according to the following procedures.

A. Cuttability

The respective cleaning sheet members 6 were fixed to the case sheet members 4 and then subjected to punching at a punching speed of 120 punchings per minute to provide openings 8 for inserting a rotation driving shaft and openings 9 for inserting magnetic heads together with the case sheet members 4. State of fluffy occurrence at cut parts of the openings 8 and 9 was observed.

B. Cleanability

The respective magnetic disk cartridges were placed in a recording reproducing apparatus, and the magnetic disk 2 was made to turn in the cartridge case 1, and a small amount of iron powders was added into the cartridge case 1 from the openings 9 for inserting the magnetic heads. Then, the disk was made to turn for 10 minutes. Then, the cartridge case 7 was unfolded to observe the state of adhesion of the iron powders to the cleaning sheet 3.

C. Magnetic disk scratchability

By turning a magnetic disk in the respective magnetic cartridge case continuously for one week (168 hours) at the ordinary temperature, occurrence of scratches on the magnetic disk by the respective cleaning sheets was observed.

D. Lint characteristics

A predetermined amount of the respective cleaning sheets were dipped in a Freon solvent and subjected to ultrasonic vibrations for 10 minutes to observe the state of falling away of the fibers from the respective cleaning sheets.

E. Weldability

The respective cleaning sheet members 6 were spotwise welded to the case sheet members 4 at a spot distance of 7 mm by ultrasonic or heat welding or by hot press, as described above, to once fix the cleaning sheet members 6 to the case sheet members 4. An edge part of the welded cleaning sheet members 6 was peeled off from the case sheet members 4 to a length of about 5 cm at a width of about 1 cm in a stripe form, while leaving the remaining body part as fixed on the case sheet member 4. By placing the case sheet member 4 on the upside and the cleaning sheet member 6 on the downside, the peeled part of the cleaning sheet member 6 was made to hang down from the case sheet member 4. A load was applied in the peeling direction of the cleaning sheet member 6 from the case sheet member 4 by fixing a weight to the tip end of the hanging-down part of the cleaning sheet member 6. A load weight (g) with which the fixed part (welded part) of the cleaning sheet member 6 started to peel off from the case sheet member 4 was measured by slowly increasing the weight.

The results of these tests are shown in the following Table.

TABLE

| Sample | Cuttability | Cleanability | Scratch-ability | Lint characteristics | Weldability |
|---|---|---|---|---|---|
| Example 1-A (ultrasonic welding) | No substantial fluffy development | Much attachment of iron powders | No scratches observed | Slight falling away of fibers observed | 100 g |
| Example 1-B (Heat welding) | No substantial fluffy development | Much attachment of iron powders | No scratches observed | Slight falling away of fibers observed | " |
| Example 2-A (Ultrasonic welding) | No substantial fluffy development | Much attachment of iron powders | No scratches observed | No substantial falling away of fibers | " |
| Example 2-B (Heat welding) | No substantial fluffy development | Much attachment of iron powders | No scratches observed | No substantial falling away of fibers | " |
| Example 3-A (Ultrasonic welding) | No substantial fluffy development | Much attachment of iron powders | No scratches observed | No substantial falling away of fibers | " |
| Example 3-B (Heat welding) | No substantial fluffy development | Much attachment of iron powders | No scratches observed | No substantial falling away of fibers | " |
| Example 4 (Ultrasonic welding) | No substantial fluffy development | Much attachment of iron powders | No scratches observed | No substantial falling away of fibers | " |
| Comparative Example (Heat welding) | No substantial fluffy development | Much attachment of iron powders | No scratches observed | No substantial falling away of fibers | 10 g |
| Conventional Example 1 (Heat welding) | No substantial fluffy development | Rather less: attachment of iron powders | Considerable scratches observed | A few falling away of fibers observed | 100 g |
| Conventional Example 2 (Heat welding) | Many fluffy developments observed | Less attachment of iron powders | Scratches observable | Slight falling away of fibers observed | 20 g |

As is obvious from the foregoing test results, the present magnetic disk cartridges according to Examples 1, 2, 3 and 4 have better cuttability, cleanability, magnetic disk scratchability, lint characteristics and weldability than those according to Comparative Example and Conventional Examples 1 and 2.

In FIGS. 9 to 13, a fourth embodiment of the present invention is shown.

Figure 9:
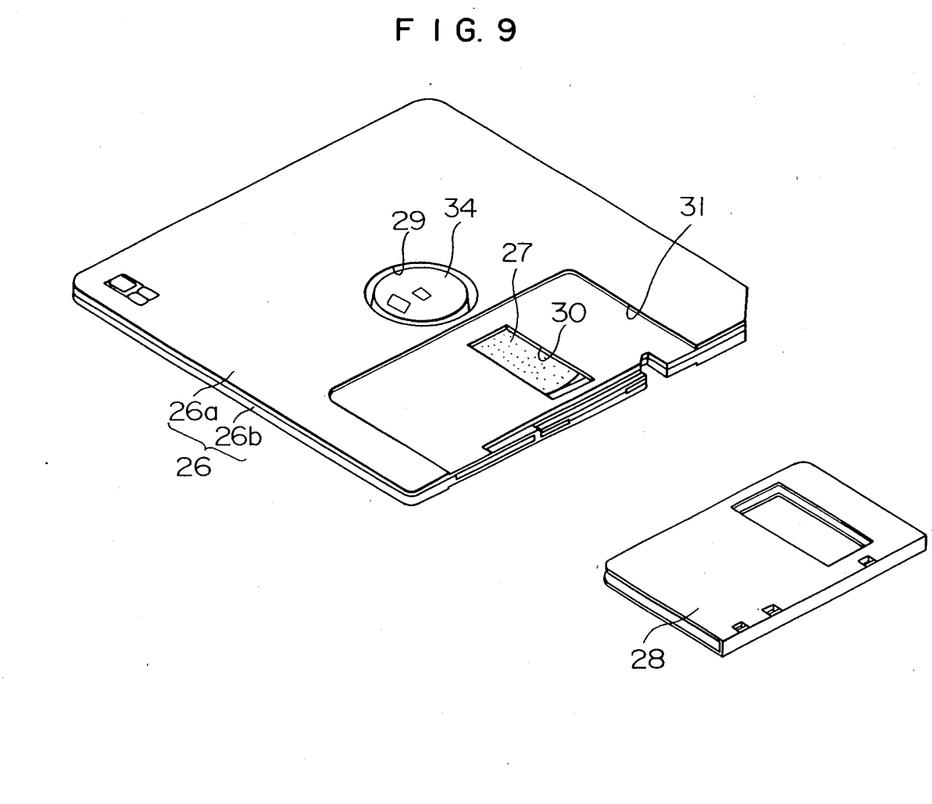
FIG. 9 is a dismantled, schematic view of a magnetic disk cartridge according to a third embodiment of the present invention.

As shown in FIG. 9, a magnetic disk cartridge comprises a cartridge case 26, a magnetic disk 27 rotatably encased in the cartridge case 26, and a shutter 28 slidably supported on the cartridge case 26.

The cartridge case 26 is composed of an upper case 26a and a lower case 26b, which are injection molded from a rigid resin, for example, ABS resin.

An opening 29 for inserting a rotation driving shaft is provided substantially at the center of the lower case 26b, and a rectangular opening 30 for inserting a magnetic head is provided near the opening 29. Similarly, an opening for inserting the magnetic head is provided on the upper case 26a. At the parts near the front side of the upper and lower cases 26a and 26b, there are provided recesses 31 in a slight depth to control the sliding range of the shutter 28. The openings 30 for inserting the magnetic heads are provided at the intermediate position in the recesses 31.

Figure 10:
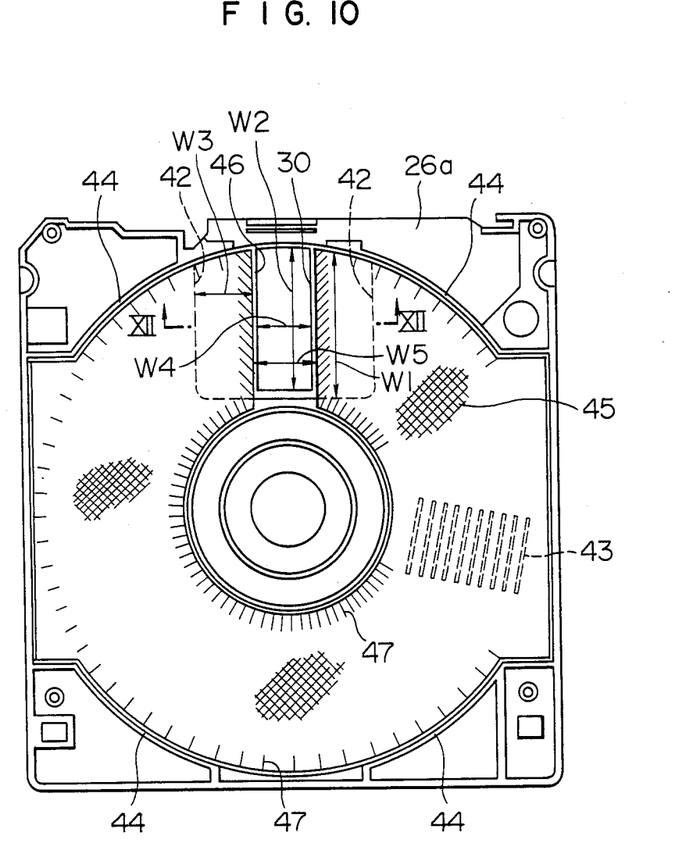
FIG. 10 is a bottom plan view of an upper case of the magnetic disk cartridge of FIG. 9 where the cleaning sheet is provided thereon.

As shown in FIG. 10, recesses 42 and 42 are provided on the inside surface of the upper case 26a and on both sides along the opening 30 for inserting the magnetic head. The longitudinal width W1 of the recesses 42 is controlled to be substantially equal to the width (longitudinal width) W2 in the longitudinal direction of the opening 30 for inserting the magnetic head, and the lateral width W3 of the recesses 42 is controlled to be at least 0.3 times, preferably 0.5 to 1.5 times the width (lateral width) W4 in the direction perpendicular to the longitudinal direction of the opening 30 for inserting the magnetic head. On the disk-coming side in the disk-turning direction with respect to the opening 30 for inserting the magnetic head on the upper case 26a there are provided projections 43 extended in a large number of rows, where the projections in both outermost rows are slightly higher than the rows 43 in the inner rows.

On the inside surface of the upper case 26a, there are provided arc-formed control ribs 44 that control the encasing position of the magnetic disk 27, and a part of the control rib 44 extends over the edge part of the recess 42 to serve as a reinforcing member for the peripheral edge of the recess 42.

As shown in FIG. 10, a substantially C-shaped cleaning sheet 45 having the same structure as that of the said first embodiment, the said second embodiment or the said third embodiment is placed within the control ribs 44. Lateral width W5 of an opening 46 of the cleaning sheet 45 provided at a position corresponding to the opening 30 for inserting the magnetic head is designed to be slightly larger than the lateral width W4 of the opening 30 for inserting the magnetic head. By placing the cleaning sheet 45 on the inside surface of the upper case 26a, the recess 42 and the projections 43 are covered by the cleaning sheet 45 and the cleaning sheet 45 is welded to the upper case 26a on the peripheral part by ultrasonic wave or heat. Since the recess 42 of the upper case 26a as a sufficient area, as described above, the edge part of the opening 46 of the cleaning sheet 45 can be welded by ultrasonic wave or heat within the recess 42 as shown by 47 in FIG. 12.

Figure 11:
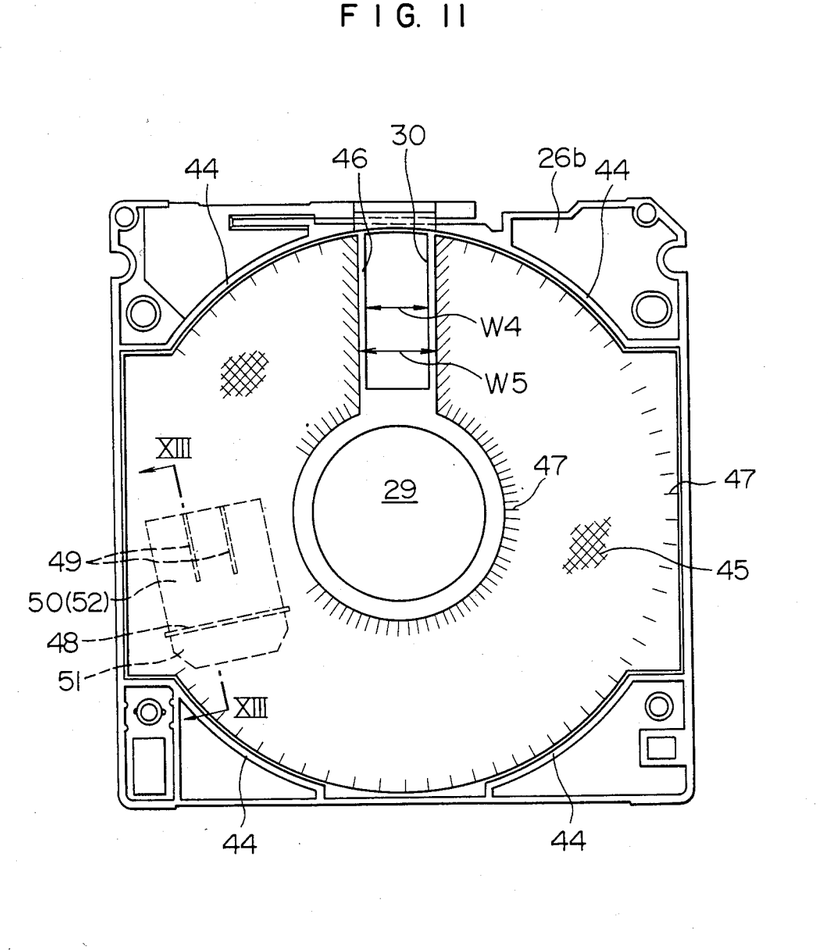
FIG. 11 is a plan view of a lower case thereof where the cleaning sheet is provided thereon.
Figure 13:
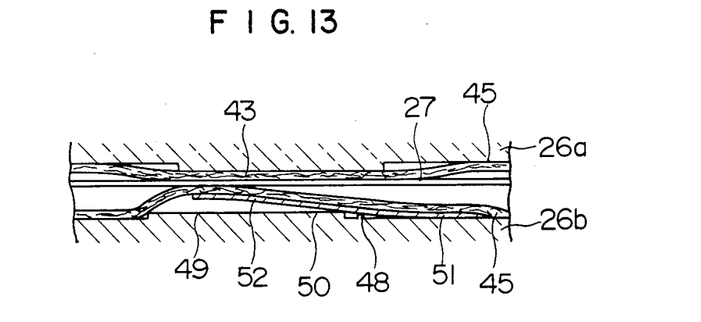
FIG. 13 is an enlarged, cross-sectional view of the neighborhood of the elastic piece of the magnetic disk cartridge along the line XIII—XIII of FIG. 11.

As shown in FIG. 11, a support 48 for electrically supporting an elastic piece 50 and the projected rows 49 for preventing the magnetic sheet from sticking are provided on the inside surface of the lower case 26b at positions substantially counterposed to the projections 43 on the upper case 26a. As shown in FIG. 11 and FIG. 13, the base part 51 of an elastic piece 50 formed by folding a plastic sheet is fixed to the position near the support 48 on the inside surface of the lower case 26b by an appropriate means by bonding or heat welding. The free end 52 of the elastic piece 50 is supported by the support 48 and retained in an inclined state.

Also on the inside surface of the lower case 6b, there are projected control ribs 44. The cleaning sheet 45 is placed within the control ribs 44. Lateral width W5 of the opening 46 of the cleaning sheet 45 provided at the position corresponding to the opening 30 for inserting the magnetic head is designed to be somewhat larger than the lateral width W4 of the opening 30 for inserting the magnetic head. As shown in FIG. 11, the elastic piece 50 is covered by the cleaning sheet 45 within the control ribs 44 on the lower case 26b, and the cleaning sheet 45 is welded to the lower case 26b at the peripheral part by ultrasonic wave or heat as shown by spots 47, but the ultrasonic or heat welding is not carried out in the area near the elastic piece 50.

When a magnetic disk cartridge is built up with the upper case 26a and the lower case 26b, the cleaning sheet 45 on the lower case 26b is partially lifted by the elastic piece 50, as shown in FIG. 13, and also the lifting is somewhat lowered by the projections 43 provided on the upper case 26a to elastically pinch the magnetic disk 27 by the upper and lower cleaning sheets 45. The disk surfaces are cleaned by the cleaning sheets 45 as the magnetic disk 27 turns.

Figure 12:
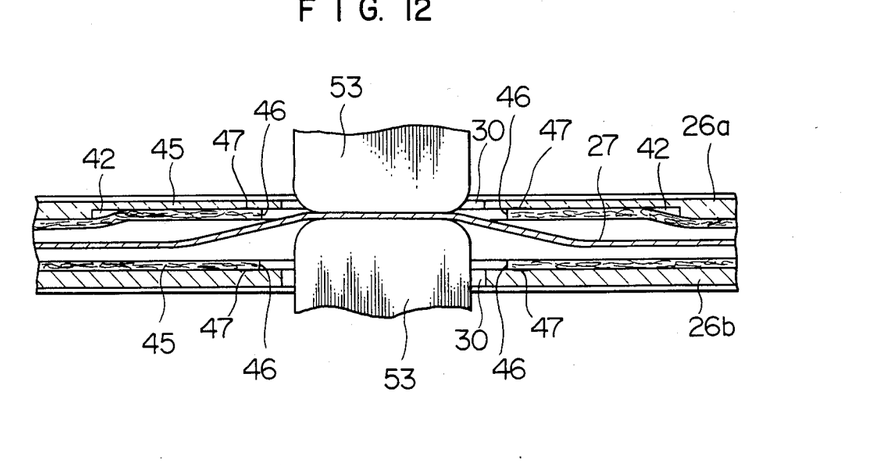
FIG. 12 is an enlarged, cross-sectional view of the neighborhood of the openings for inserting the magnetic heads along the line XII—XII of FIG. 10 while the magnetic disk cartridge is put into operation.

FIG. 12 shows the state of the disk cartridge in operation where numeral 53 represents magnetic heads.

In this fourth embodiment, it was found that the magnetic disk cartridge had better cuttability, cleanability, magnetic disk scratchability, lint characteristics and weldability than those of cleaning sheet members composed of other materials, as in the case of using the said case sheet member made of rigid polyvinyl chloride resin.

As described above, the present cleaning sheet has a disk-facing layer composed of a non-woven fabric layer made mainly of acrylic fibers, which are very soft and flexible among the synthetic fibers, and have a good effect without damaging the turning disk surface and without any fluffy occurrence. Owing to the good cuttability, a portion of fibers never stick out, for example, from the edges of the openings for inserting the magnetic head or a rotation driving shaft into the openings, where a disc cartridge is prepared by cutting. Particularly, when the fibers stick out into the openings for inserting the magnetic heads, errors may appear during the recording or reproduction due to the stuck-out fibers, but in the present invention no such errors due to the stuck-out fibers appear because of the distinguished cuttability of acrylic fibers as described above.

Furthermore, a cleaning sheet having such characteristics as described above is fixed to the inside surface of a cartridge case by ultrasonic or heat welding; neither burning of fibers nor formation of hard materials takes place on the disk-facing side of the cleaning sheet. Thus, the aforementioned characteristics of acrylic fibers can be fully exhibited without any error, but with a high welding strength of the cleaning sheet and with no fear of release of the cleaning sheet from the cartridge case.

Furthermore, at least a portion of the fibers in the cartridge case-facing, non-woven fabric in the cleaning sheet are embedded into the inside surface region of the cartridge case by ultrasonic or heat welding while retaining the fiber form substantially. Thus, the linking between the cartridge case and the fibers, in other words, between the cartridge case and the cleaning sheet, is so strong that there is no fear of release of the cleaning sheet from the cartridge case, even if a torsion acts on the cleaning sheet by the sliding contact with the magnetic disk during the operation of the magnetic disk cartridge.

Thus, the present invention can provide a magnetic disk cartridge having a cleaning sheet of distinguished disk-handling characteristics and cartridge case-fixing characteristics.

What is claimed is:

1. A disk cartridge which comprises a cartridge case, a disk rotatably encased in the cartridge case, and a cleaning sheet supported on the inside surface of the cartridge case by welding, the cartridge case being composed of a thermoplastic synthetic resin, and the cleaning sheet being composed of non-woven fabric made mainly of acrylic fibers at least on the disk-facing side of the cleaning sheet, said acrylic fibers containing more than about 85% acrylonitrile, and being fixed to the inside surface of the cartridge case by ultrasonic or heat welding.

2. A disk cartridge according to claim 1, wherein said non-woven fabric consists essentially of said acrylic fibers at least on said disk-facing side.

3. A disk cartridge according to claim 1, wherein said non-woven fabric is made of said acrylic fibers and not more than 50% by weight of additional fibers made from a material selected from the group consisting of polyethylene terephthalate, polypropylene, polyamide and rayon at least on said disk-facing side of said cleaning sheet.

4. A disk cartridge according to claim 1, wherein the cleaning sheet is composed of a sheet member of multilayer structure comprising a disk-facing non-woven fabric layer composed of a non-woven fabric made mainly of said acrylic fibers on the disk-facing side and a cartridge case-facing non-woven fabric layer composed of a nonwoven fabric containing fibers at least a portion of which are embeddable into the inside surface of the cartridge case by ultrasonic or heat welding of the cleaning sheet to the cartridge case while substantially retaining the fiber form.

5. A disk cartridge according to claim 4, wherein the disk-facing non-woven fabric layer is composed of said acrylic fibers alone.

6. A disk cartridge according to claim 4, wherein the cartridge case is composed of polyvinyl chloride and the cartridge case-facing, non-woven fabric layer contains rayon fibers.

7. A disk cartridge according to claim 4, wherein the disk-facing non-woven fabric layer is thicker than the cartridge case-facing non-woven fabric layer.

8. A disk cartridge according to claim 4, wherein said disk-facing non-woven fabric layer consists essentially of said acrylic fibers.

9. A disk cartridge according to claim 4, wherein said disk-facing non-woven fabric layer comprises said acrylic fibers and not more than 50% by weight of additional fibers made of a material selected from the group consisting of polyethylene terephthalate, polypropylene, polyamide and rayon.

10. A disk cartridge according to claim 4, wherein an intermediate layer composed of a non-woven fabric containing thermoplastic fibers is provided between the disk-facing non-woven fabric layer and the cartridge case-facing non-woven fabric layer.

11. A disk cartridge according to claim 10, wherein the disk-facing non-woven fabric layer is a non-woven fabric layer composed of said acrylic fibers alone, the intermediate layer is a non-woven fabric layer composed of said acrylic fibers and polyethylene terephthalate fibers, and the cartridge case-facing non-woven fabric layer is non-woven fabric layer composed of polyethylene terephthalate fibers and rayon fibers.

12. A disk cartridge according to claim 4 or 11, wherein the disk-facing surface of the cleaning sheet has an embossing pattern formed by embossing.

13. A disk cartridge according to claim 1 or 11, wherein said acrylic fibers have a size of 1 to 6 denier.

14. A disk cartridge which comprises a cartridge case, a disk rotatably encased in the cartridge case, and a cleaning sheet supported on the inside surface of the cartridge case by welding, the cartridge case being composed of a thermoplastic synthetic resin, and the cleaning sheet being composed of non-woven fabric made of acrylic fibers along, said acrylic fibers containing more than about 85% acrylonitrile, and being fixed to the inside surface of the cartridge case by ultrasonic welding.

* * * * *